United States Patent [19]

Takahashi et al.

[11] Patent Number: 4,736,728
[45] Date of Patent: Apr. 12, 1988

[54] EXHAUST GAS RECIRCULATING SYSTEM

[75] Inventors: Hiroshi Takahashi; Tadahisa Naganawa, both of Toyota, Japan

[73] Assignee: Toyota Jidosha Kabushiki Kaisha, Aichi, Japan

[21] Appl. No.: 937,899

[22] Filed: Dec. 4, 1986

[30] Foreign Application Priority Data

Jan. 17, 1986 [JP] Japan .................... 51-5467[U]

[51] Int. Cl.$^4$ .......................................... F02M 25/06
[52] U.S. Cl. .................................... 123/571; 123/568; 74/860; 180/197
[58] Field of Search ................. 123/568, 569, 571; 74/859, 860; 180/197

[56] References Cited

U.S. PATENT DOCUMENTS

| 3,888,143 | 6/1975 | Kolehmainen et al. | 123/571 X |
| 4,434,776 | 3/1984 | Shirase et al. | 123/568 |
| 4,454,854 | 6/1984 | Gotoh et al. | 123/571 |
| 4,467,673 | 8/1984 | Hamada et al. | 123/571 X |
| 4,615,410 | 10/1986 | Hosaka | 180/197 |
| 4,620,420 | 11/1986 | Gloss et al. | 180/197 X |
| 4,637,487 | 1/1987 | Nakamura et al. | 180/197 |

*Primary Examiner*—Willis R. Wolfe, Jr.
*Attorney, Agent, or Firm*—Kenyon & Kenyon

[57] ABSTRACT

An exhaust gas recirculating system provided with exhaust gas recirculation interrupting means which operates to make the exhaust gas recirculation control valve interrupt recirculation of the exhaust gas when a traction control system for preventing wheel slip is operated.

6 Claims, 5 Drawing Sheets

EXHAUST GAS RECIRCULATING SYSTEM

BACKGROUND OF THE INVENTION

1. Field of the Invention

The present invention relates to an exhaust gas recirculating system for an automobile.

2. Description of the Prior Art

An exhaust gas recirculating system is a system which operates to return part of the exhaust gas emitted from an engine to the intake system (this operation is called recirculation of exhaust gas), thereby reducing the amount of nitrogen oxides in the exhaust gas.

A conventional exhaust gas recirculating system will be briefly described.

Figure 3:
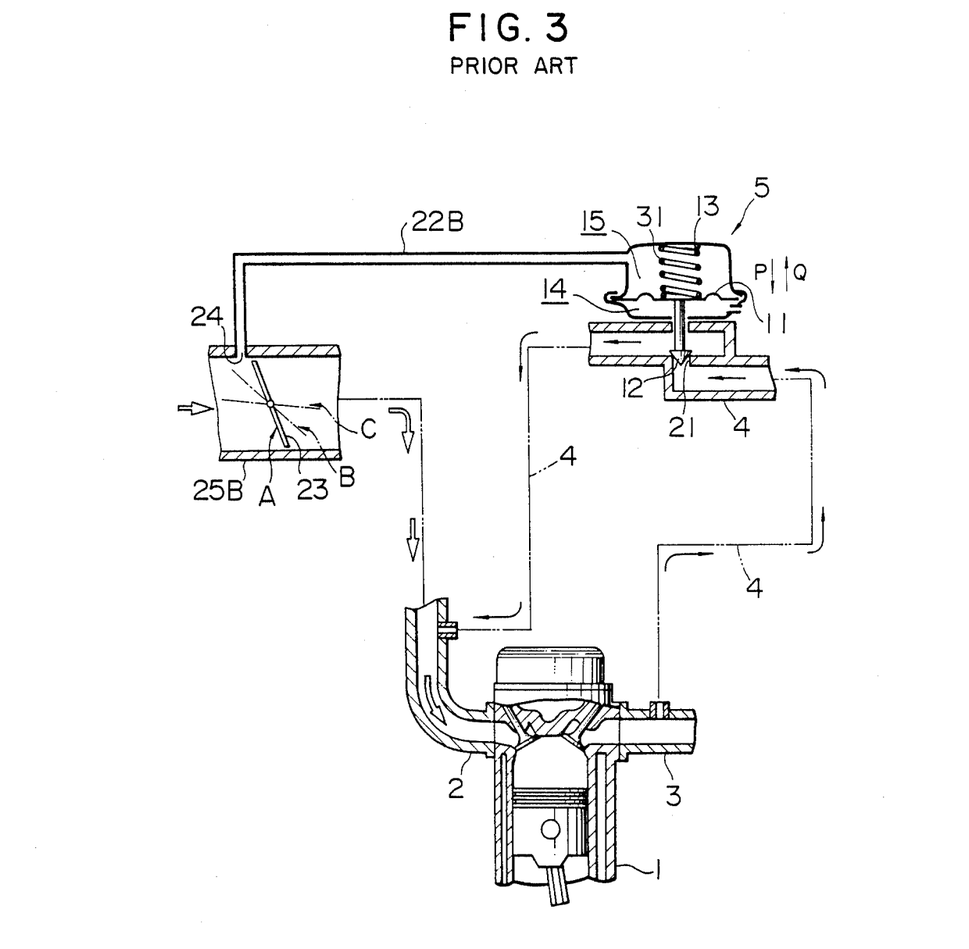
FIG. 3 is a view of the whole structure of a conventional exhaust gas recirculating system.

FIG. 3 is a view of the whole structure of a conventional exhaust gas recirculating system. Such a system as shown in FIG. 3 is already known.

In FIG. 3, reference number 1 designates the main body of an engine, reference number 2 designates an intake manifold, and reference number 3 designates an exhaust manifold. The black arrows indicate the flow of recirculated exhaust gas, while the white arrows indicate the flow of intake air.

The exhaust manifold 3 and the intake manifold 2 communicate with each other via an exhaust gas recirculating passage 4. An exhaust gas recirculation control valve 5 is arranged in the exhaust gas recirculating passage 4. This exhaust gas recirculation control valve 5 is provided for the purpose of controlling the amount of exhaust gas recirculated.

The exhaust gas recirculation control valve 5 has a valve body 12 which is driven by a diaphragm 11. A valve port 21 provided in the exhaust gas recirculating passage 4 is opened or closed by the valve body 12 whereby the amount of exhaust gas recirculated is controlled.

In the exhaust gas recirculation control valve 5, the inside of a diaphragm case 13 is divided into a first chamber 14 and a second chamber 15 by the diaphragm 11.

The first chamber 14 is opened to the atmosphere. On the other hand, the second chamber 15 is communicated with a negative pressure port 24, formed in a carburetor 25 at a location immediately above a throttle valve 23, via a negative pressure passage 22B.

The diaphragm 11 of the exhaust gas recirculation control valve 5 is driven by negative pressure which is produced in the negative pressure port 24. The exhaust gas recirculation is controlled in the following three ways.

First, when the engine is in an idling condition or when it is in an extremely light-load operating condition, since the throttle valve 23 is in the position indicated by the arrow A, atmospheric pressure is produced in the negative pressure port 24. Therefore, atmospheric pressure prevails in the second chamber 15, and the diaphragm 11 is urged in the direction indicated by the arrow P by the force of a compression coil spring 31, thus causing the valve body 12 to close the valve port 21. As a result, the exhaust gas is not recirculated.

Secondly, when the engine is in a medium-load or a light-load operating condition, since the throttle valve 23 is in the position indicated by the arrow B, negative pressure is produced in the negative pressure port 24. Therefore, negative pressure prevails in the second chamber 15, and the diaphragm 11 is urged in the direction indicated by the arrow Q, thus causing the valve body 12 to open the valve port 21. As a result, the exhaust gas is recirculated.

Thirdly, when the engine is in a high-load operating condition, since the throttle valve 23 is positioned as indicated by the arrow C, atmospheric pressure is produced in the negative pressure port 24. Therefore, atmospheric pressure prevails in the second chamber 15, and the diaphragm 11 is urged in the direction indicated by the arrow P by the force of a compression coil spring 31, thus causing the valve body 12 to close the valve port 21. As a result, the exhaust gas is not recirculated.

As will be understood from the above description, the conventional exhaust gas recirculating system is arranged such as to interrupt exhaust gas recirculation when the engine is in an idling condition, in an extremely light-load operating condition, or in a high-load operating condition. This is for the followings reasons.

Namely, when the engine is in an idling condition, or in an extremely light-load operating condition, the engine is in a region where the amount of mixture supplied to the engine is small. Therefore, if exhaust gas recirculation should be effected at such a time, combustion would become unstable, causing malfunction of the engine.

In addition, the reason for suspending exhaust gas recirculation when the engine is in a high-load operating condition is that the exhausted amount of nitrogen oxides is basically small at such a time, and there is therefore no substantial need to effect recirculation of the exhaust gas.

Particular attention should be paid to the point that no exhaust gas recirculation is effected when the engine is in an idling condition or in an extremely light-load operating condition.

Following the above description of the conventional exhaust gas recirculating system, an explanation will now be given of a traction control system with which automobiles are often equipped, such a system being completely separate from the exhaust gas recirculating system.

A traction control system is an art utilized to prevent wheel slip (i.e. prevent wheels from running without moving the vehicle forward) when the driver rapidly depresses the accelerator pedal in an attempt to suddenly accelerate the automobile.

This type of wheel slip tends to happen when an automobile is being run on a snow-covered road. In the case of a rear wheel drive vehicle, for example, it is the rear wheels that would slip, and when this happens, the driving force cannot be transmitted to the road surface, and the vehicle cannot move forward. A traction control system is provided for preventing this phenomenon of wheel slip.

A conventional traction control system will be briefly described.

Figure 4:
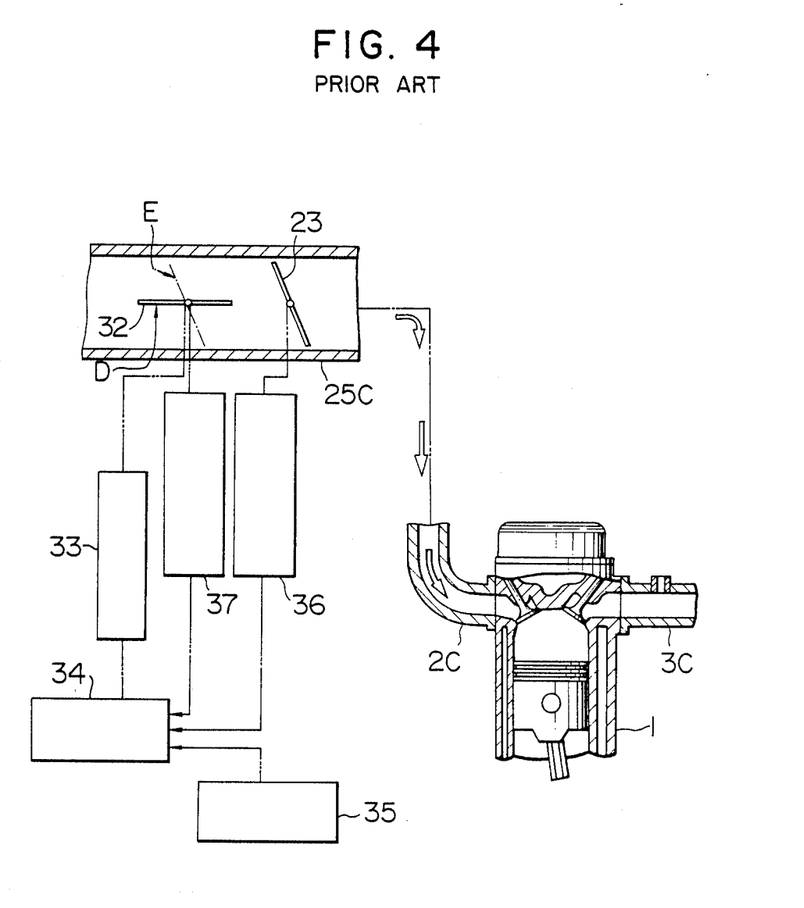
FIG. 4 is a view of the whole structure of a traction control system.

FIG. 4 is a view of the whole structure of a conventional traction control system. A system such as that shown in FIG. 4 is already known.

In FIG. 4, reference number 1 designates the main body of an engine, reference number 2C designates an intake manifold, reference number 3C designates an exhaust manifold, reference number 25C designates a carburetor, and reference number 23 designates a throttle valve. Further, reference number 32 designates a second throttle valve, reference number 33 designates a driving device for driving the second throttle valve 32, reference number 34 designates a control device for controlling the driving device 33, and reference number 35 designates a slip sensor. In addition, reference number 36 designates a throttle valve opening detecting sensor for detecting and outputting the opening of the throttle valve 36, and reference number 37 designates a second throttle valve opening detecting sensor for detecting and outputting the opening of the second throttle valve 32. The white arrows indicate the flow of intake air.

The traction control system comprises the second throttle valve 32, the driving device 33, the control device 34, the slip sensor 35, the throttle valve opening detecting sensor 36, and the second throttle valve opening detecting sensor 37.

The operation of the conventional traction control system installed, for instance, in a rear wheel drive vehicle will now be described.

The second throttle valve 32 is fully opened as indicated by the arrow D when the wheels are not experiencing slip. On this occasion, therefore, the situation is the same as the case where the second throttle valve 32 is not provided.

Assume that the wheels begin to slip as a result of the driver rapidly depressing the accelerator pedal in an attempt to suddenly accelerate the vehicle. Since this wheel slip is actually the running of the rear wheels without moving the vehicle forward, when this slip takes place, the rotational speed of the front wheels is lower than that of the rear wheels. Thus, the difference between the rotational speed of the front wheels and that of the rear wheels is detected by the slip sensor 35, and when it is made clear that the front wheels have rotational speed which is lower than that of the rear wheel, the control device 34 judges that slip is taking place. Subsequently, the control device 34 operates to make the driving device 33 close the second throttle valve 32 to a very-small-opening position (indicated by the arrow E). When the second throttle valve 32 is closed to a very small opening position, since the amount of intake air is reduced, the result is the same as when the accelerator pedal is allowed to return. Thus, the output torque of the engine is reduced and the wheel slip ceases. (Since slip occurs when the tires are subjected to torque which is larger than the driving force, no slip will take place if the torque is reduced below the driving force.)

As will be understood from the above description, a conventional traction control system is an art designed to reduce the degree of sensitivity of the accelerator pedal when unnecessarily large torque is produced. In order to cause this drop in the degree of sensitivity of the accelerator pedal, the second throttle valve 32 is provided.

Incidentally, when closing the second throttle valve 32 to a very-small-opening position, it is moved in a two-step manner in which, it is at first rapidly closed to the same opening position as that of the throttle valve 23, and is thereafter closed relatively gradually to a very-small-opening position that indicated by the arrow E).

The reason for this is that a shock might be caused if the second throttle valve 32 were to be rapidly closed to the very-small-opening position (indicated by the arrow E). The throttle valve opening detecting sensor 36 and the second throttle valve opening detecting sensor 37 are provided for making the movement of the throttle valve 32 whereby it is at first closed to the same opening position as that of the throttle valve 23 and then closed relatively gradually to the very-small-opening position (indicated by the arrow E).

For reference, it should be made clear that an alternative art for reducing the degree of sensitivity of the accelerator pedal when unnecessarily large torque is produced by the engine is shown, for example, in Japanese Utility Model Laid-Open No. 59-127847, this being different from a traction control system.

Next, consider a case where an exhaust gas recirculating system is provided in an automobile which is provided with a traction control system as described above.

Figure 5:
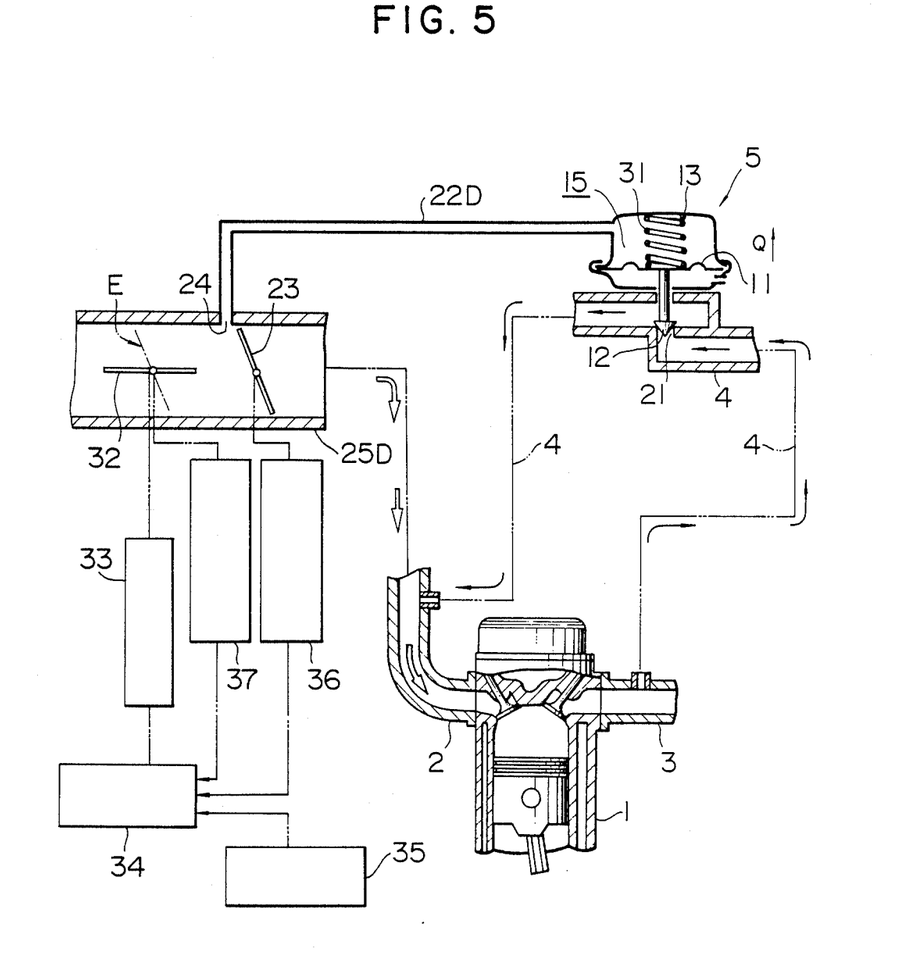
FIG. 5 is a view of the whole structure of an engine provided with a traction control system and a conventional exhaust gas recirculating system.

Such a case is shown in FIG. 5.

FIG. 5 is a view of the whole arrangement of an engine provided with a traction control system and an exhaust gas recirculating system. Such an engine as shown in FIG. 5 was not known prior to the present application.

In FIG. 5, reference number 1 designates the main body of an engine, reference number 2 designates an intake manifold, and reference number 3 designates an exhaust manifold. Reference number 25D designates a carburetor, and reference number 23 a throttle valve. Further, reference number 32 designates a second throttle valve, reference number 33 designates a driving device for driving the second throttle valve 32, reference number 34 designates a control device for controlling the driving device 33, reference number 35 designates a slip sensor, reference number 36 designates a throttle valve opening detecting sensor, and reference number 37 designates a second throttle valve opening detecting sensor.

The exhaust manifold 3 and the intake manifold 2 communicate with each other via an exhaust gas recirculating passage 4. An exhaust gas recirculation control valve 5 is arranged in the exhaust gas recirculating passage 4.

Assume that the rear wheels begin to slip as a result of the driver rapidly depressing the accelerator pedal (not shown) in an attempt to sharply accelerate the automobile.

Because wheel slip begins to take place in the automobile, the traction control system operates to close the second throttle valve 32 to a position as indicated by the arrow E. Because of this operation, the amount of intake air is reduced, thereby substantially bringing the engine into an extremely light-load operating condition, and thus the wheel slip ceases.

On this occasion, since the second throttle valve 32 is closed to a position as indicated by the arrow E, negative pressure prevails in the carburetor downstream of the second throttle valve 32. Therefore, negative pressure is produced in the negative pressure port 24, and accordingly, negative pressure is also produced in the second chamber 15 of the exhaust gas recirculation control valve 5. Because of this, the diaphragm 11 is urged in the direction indicated by the arrow Q, causing the valve body 12 to open the valve port 21. Therefore, the exhaust gas is recirculated in spite of the fact that the engine is substantially brought into an extremely light-load operating condition.

As described above, the combination of the conventional systems shown in FIG. 5 has encountered problems in that exhaust gas is recirculated even when the engine is substantially brought into an extremely light-load operating condition (by the operation of the traction control system).

Consequently, in the prior art, combustion becomes unstable, causing malfunction of the engine.

SUMMARY OF THE INVENTION

It is an object of the present invention to solve the problem encountered by the prior art, and more specifically to provide an arrangement whereby exhaust gas recirculation is suspended in an engine provided with a traction control system and an exhaust gas recirculating system when the traction control system is operated and the engine is substantially brought into an extremely light-load operating condition.

That is, an exhaust gas recirculating system in accordance with the present invention is an exhaust gas recirculating system in which the amount of exhaust gas recirculated to the intake system of an engine can be controlled by an exhaust gas recirculation control valve, the system being provided with exhaust gas recirculation interrupting means which operates to make the exhaust gas recirculation control valve interrupt recirculation of the exhaust gas when a traction control system for preventing wheel slip is operated.

Therefore, because the exhaust gas recirculating system of the invention is provided with the above exhaust gas recirculation interrupting means, recirculation of the exhaust gas is interrupted when the traction control system is operated and the engine is substantially brought into an extremely light-load operating condition.

DESCRIPTION OF THE PREFERRED EMBODIMENTS

Figure 1:
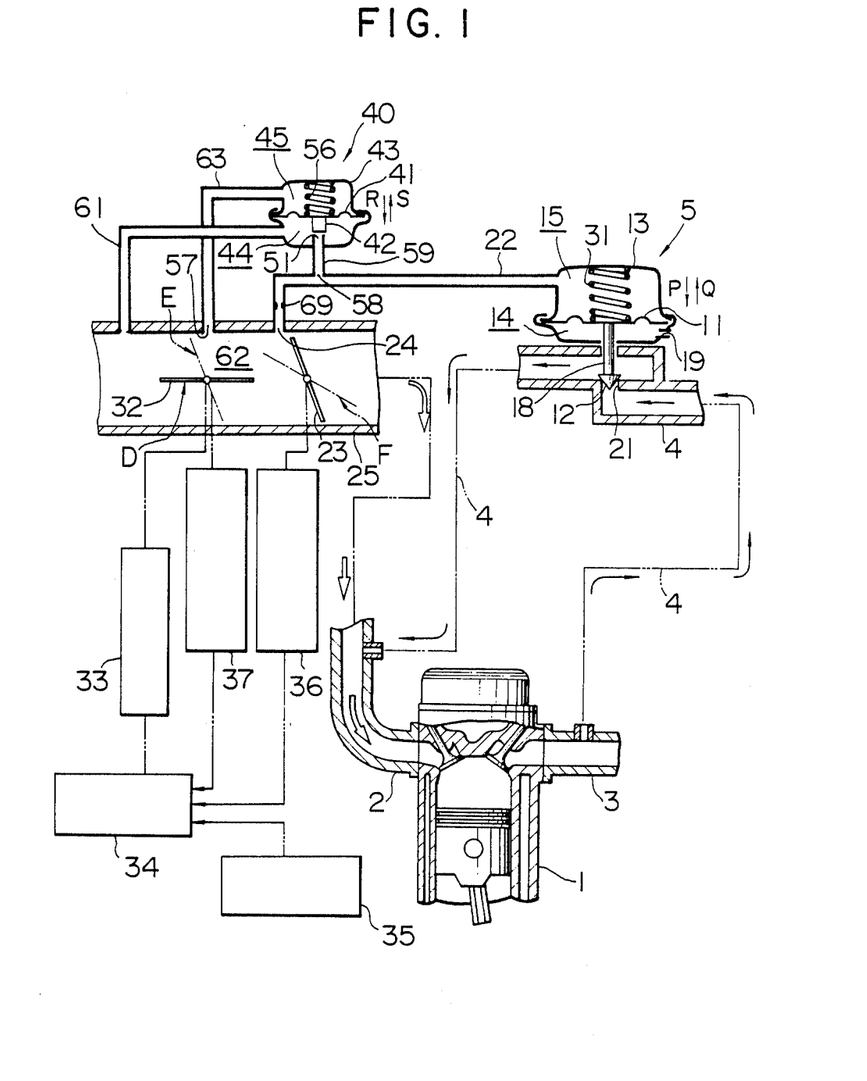
FIG. 1 is a view of the whole structure of an exhaust gas recirculating system in accordance with a first embodiment of the invention.

FIG. 1 is a view of the whole structure of an exhaust gas recirculating system in accordance with a first embodiment of the invention.

In FIG. 1, reference number 1 designates the main body of an engine, reference number 2 designates an intake manifold, reference number 3 designates an exhaust manifold. Reference number 25 designates a carburetor, and reference number 23 designates a throttle valve. The black arrows indicate the flow of recirculated exhaust gas, while the white arrows indicate the flow of intake air.

Further, reference number 32 designates a second throttle valve, reference number 33 designates a driving device for driving the second throttle valve 32, reference number 34 designates a control device for controlling the driving device 33, and reference number 35 designates a slip sensor, reference number 36 designates a throttle valve opening detecting sensor for detecting and outputting the opening of the throttle valve 23, and reference number 37 designates a second throttle valve opening detecting sensor for detecting and outputting the opening of the second throttle valve 32.

The slip sensor 35 detects the difference between the rotational speed of the front wheels and that of the rear wheels and outputs a signal which is indicative of the difference.

A traction control system comprises the second throttle valve 32, the driving device 33, the control device 34, the slip sensor 35, the throttle valve opening detecting sensor 36, and the second throttle valve opening detecting sensor 37.

The exhaust manifold 3 and the intake manifold 2 communicate with each other via an exhaust gas recirculating passage 4. An exhaust gas recirculation control valve 5 is arranged in the exhaust gas recirculating passage 4. The exhaust gas recirculation control valve 5 and the exhaust gas recirculating passage 4 constitute an exhaust gas recirculating system.

The exhaust gas recirculation control valve 5 has a diaphragm case 13 accommodating a diaphragm 11, and a valve body 12 driven by the diaphragm 11.

The amount of exhaust gas recirculated is controlled by opening and closing a valve port 21 provided in the exhaust gas recirculating passage 4 by means of the valve body 12.

In the exhaust gas recirculation control valve 5, the diaphragm case 13 is fixed to the exhaust gas recirculating passage 4.

The inside of the diaphragm case 13 is divided into a first chamber 14 and a second chamber 15 by the diaphragm 11.

The first chamber 14 opens to the atmosphere through an open hole 19. The second chamber 15 communicates with a negative pressure port 24 formed in the carburetor 25 at a location immediately above the throttle valve 23, via a negative pressure passage 22.

The negative pressure port 24 is formed at such a location that it is positioned upstream of the throttle valve 23 when the latter is opened to an idling position or to an opening position which is very close thereto, while the port 24 is positioned downstream of the throttle valve 23 at other opening positions of the throttle valve 23.

The diaphragm 11 is connected to a rod 18. The rod 18 extends through the first chamber 14 and to the inside of the exhaust gas recirculating passage 4, and the valve body 12 is mounted on the tip end of the rod 18. The valve body 12 has a substantially conical configuration. As mentioned above, the valve body is disposed to open and close the valve port 21.

A compression coil spring 31 for urging the diaphragm 11 in the direction in which the valve body 12 closes the valve port 21 is disposed in the second chamber 15.

The exhaust gas recirculation control valve 5 operates in the following manner in accordance with the difference between pressure within the first chamber 14 and that within the second chamber 15.

That is, when the pressures within the first and second chambers 14 and 15 are substantially equal to each other, the diaphragm 11 is urged in the direction indicated by the arrow P by the force of the compression coil spring 31 whereby the valve body 12 is caused to close the valve port 21. In this case, therefore, the exhaust gas is not recirculated.

Conversely, when negative pressure is produced in the second chamber 15, and the pressure within the second chamber 15 is lower than that within the first chamber 14, the diaphragm 11 is urged in the direction indicated by the arrow Q, and the valve body 12 opens the valve port 21. In this case, therefore, the exhaust gas is recirculated.

As described before in the section concerning the Prior Art, the cases in which the exhaust gas is not to be recirculated (i.e., those cases in which the exhaust gas should not be recirculated) are three, viz. when the engine is in an idling condition, when it is an extremely light-load operating condition, and when it is in a high-load operating condition. On the other hand, a case in which the exhaust gas is to be recirculated (i.e., a case in which the exhaust gas should be recirculated) is when the engine is in a medium-load or a light-load operating condition.

The traction control system employed is exactly the same as a conventional system. The operation of the traction control system installed, for example, in a rear wheel drive vehicle will be explained below.

The second throttle valve 32 is fully opened as indicated by the arrow D when the wheels are not slipping. On this occasion, therefore, the situation is the same as the case where the second throttle valve 32 is not provided.

Assume that wheel slip begins to take place in the vehicle as a result of the driver rapidly depressing the accelerator pedal in an attempt to sharply accelerate the vehicle. Since this wheel slip is actually the rear wheels running without moving the vehicle forward, when the rotational speed of the front wheels and that of the rear wheels is compared, the situation is such that the rotational speed of the front wheels is lower than that of the rear wheels.

Thus, the difference between the rotational speed of the front wheels and that of the rear wheels is detected by the slip sensor 35, and the control device 34 judges that wheel slip is taking place. Subsequently, the control device 34 operates to make the driving device 33 close the second throttle valve 32 to a very-small-opening position (indicated by the arrow E).

When the second throttle valve 32 is closed to a very-small-opening position, since the amount of intake air is reduced, the result is the same as when the accelerator pedal is allowed to return. Thus, the output torque of the engine is reduced, and the wheel slip consequently ceases.

Incidentally, as in the case of the prior art, the present embodiment of the invention employs an arrangement wherein the second throttle valve 32 is moved in a two-step manner when being closed to a very-small-opening position; namely it is at first rapidly closed to the same opening position as that (indicated by the arrow F) of the throttle valve 23, and thereafter is closed relatively gradually to the very-small-opening position (indicated by the arrow E). The reason for this is described in the above section concerning the Prior Art.

The throttle valve opening detecting sensor 36 and the second throttle valve opening detecting sensor 37 are required for performing such a movement.

More specifically, the opening of the throttle valve 23 is detected by means of the throttle valve opening detecting sensor 36, and as comparing this with the output signal from the second throttle valve opening detecting sensor 37, the second throttle valve 32 is rapidly brought to the same opening position as that of the throttle valve 23. Thereafter, the second throttle valve 23 is gradually closed to the very-small-opening position (indicated by the arrow E).

The structure and operation of the system of the invention described above are exactly the same as those of in FIG. 5.

The present invention in accordance with the first embodiment is characterized in that, as will be seen from FIG. 1, the system is provided with an atmospheric air introducing device 40 for introducing atmospheric air into the negative pressure passage 22.

The atmospheric air introducing device 40 has the function of determining when to introduce the atmospheric air. This atmospheric air introducing device 40 will next be described.

The atmospheric air introducing device 40 has a diaphragm case 43 accommodating a diaphragm 41, and a valve body 42 driven by the diaphragm 41. The valve body 42 is fixed to the diaphragm 41.

An atmospheric air introducing passage 59 is connected to the negative pressure passage 22. The end portion of the atmospheric air introducing passage 59 forms a valve port 51. The valve port 51 is opened or closed by the valve body 42.

As will be seen from FIG. 1, an orifice 69 is provided in the negative pressure passage 22 between the negative pressure port 24 and the junction 58 of the passage 22 and the atmospheric air introducing passage 59.

In the atmospheric air introducing device 40, the inside of the diaphragm case 43 is divided into a first chamber 44 and a second chamber 45 by the diaphragm 41.

The first chamber 44 is communicated with an intake passage 62 at a location upstream of the second throttle valve 32 via an atmospheric air supply passage 61.

The second chamber 45 is communicated with the intake passage 62 at a location between the second throttle valve 32 and the throttle valve 23 via a negative pressure introducing passage 63.

The junction (a port) 57 between the negative pressure introducing passage 63 and the carburetor 25 is located, as will be seen from FIG. 1, at a location which is upstream of the throttle valve 23 and at the same time downstream of the maximum closed position (indicated by the arrow E) of the second throttle valve 32.

In the diaphragm case 43, a compression coil spring 56 for urging the diaphragm 41 in the direction whereby the valve body 42 closes the valve port 51 is disposed within the second chamber 45.

The atmospheric air introducing device 40 operates in accordance with the difference in pressure between the first and second chambers 44 and 45, in the following manner.

That is, when the pressures within the first chamber 44 and the second chamber 45 are substantially equal with each other, the diaphragm 41 is urged in the direction indicated by the arrow R by the force of the compression coil spring 56, and thus, the valve body 42 closes the valve port 51. Therefore, no atmospheric air is introduced from the valve port 51 to the negative pressure passage 22.

Conversely, when negative pressure is produced within the second chamber 45, and the pressure within the second chamber 45 is therefore lower than the pressure within the first chamber 44, the diaphragm 41 is urged in the direction indicated by the arrow S, thus causing the valve body 42 to open the valve port 51. Therefore, the atmospheric air is introduced from the valve port 51 to the negative pressure passage 22.

The operation of the system in accordance with this embodiment will next be described.

In the system shown in FIG. 1, assume that the rear wheels begin to slip as a result of the driver rapidly depressing the accelerator pedal (not shown) in an attempt to accelerate the automobile, and that the opening position of the throttle valve 23 when the driver depressed the pedal was the one indicated by the arrow F.

Because wheel slip begins to take place in the automobile, the traction control system operates to close the second throttle valve 32 to the position indicated by the arrow E. Because of this operation, the amount of intake air is reduced, thereby substantially bringing the engine into an extremely light-load operating condition, and the wheel slip consequently ceases.

At this time, since the second throttle valve 32 is closed to the position indicated by the arrow E, negative pressure prevails in the intake passage 62 at a location downstream of the second throttle valve 32. Negative pressure is also produced, therefore, in the port 57, and this negative pressure is introduced into the second chamber 45 of the atmospheric air introducing device 40 through the negative pressure introducing passage 63. Consequently, the diaphragm is lifted in the direction indicated by the arrow S, whereby the valve body 42 opens the valve port 51. As a result, atmospheric air is introduced from the atmospheric air supply passage 61 into the valve port 51, and the atmospheric air thus introduced into the valve port 51 is then supplied therefrom to the negative pressure passage 22, and enters the second chamber 15 of the exhaust gas recirculation control valve 5.

Thus, according to the present invention, when the traction control system is operated and the engine is substantially brought into an extremely-light load operating condition, the exhaust gas is not recirculated, thereby avoiding any possibility of malfunctioning of the engine.

Incidentally, the reason for providing the orifice 69 in the negative pressure passage 22 in the present embodiment is to prevent atmospheric air escaping from the negative pressure port 24 when it is introduced from the valve port 51. If atmospheric air were to escape from the negative pressure port 24, it would not be the atmospheric air alone that would be within the second chamber 15 of the exhaust gas recirculation control valve 5. In addition, the air/fuel ratio of the mixture in such case would be adversely affected, thus leading to malfunctioning of the engine. Therefore, the orifice 69 is provided in the negative pressure passage 22 in order to prevent the occurrence of these defects.

When the traction control system is inoperative, since the second throttle valve 32 is positioned as indicated by the arrow D, atmospheric pressure prevails within the second chamber 45 of the atmospheric air introducing device 40. Consequently, the valve body 42 closes the valve port 51, and the situation is therefore the same as when the atmospheric air introducing device 40 is not provided. As a result, the exhaust gas recirculation control valve 5 operates in exactly the same way as that in the conventional system (shown in FIG. 3) at this time.

As will be understood from the above description, the exhaust gas recirculation interrupting means corresponds, in this embodiment, to the atmospheric air introducing device 40.

Figure 2:
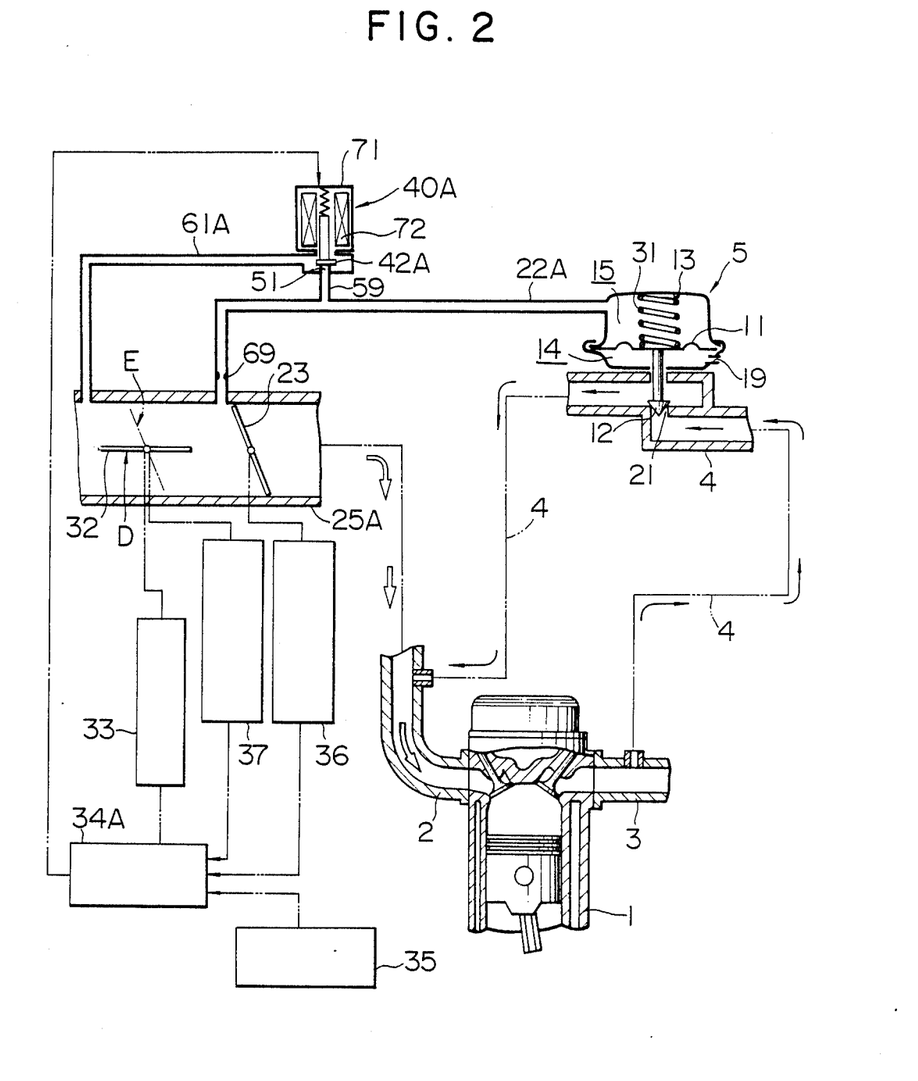
FIG. 2 is a view of the whole structure of an exhaust gas recirculating system in accordance with a second embodiment of the invention.

FIG. 2 is a view of the whole structure of an exhaust gas recirculating system in accordance with a second embodiment of the invention.

A diaphragm is used in the atmospheric air introducing device 40 in accordance with the first embodiment of the invention, while an electromagnetic valve is used in the atmospheric air introducing device 40A in accordance with the second embodiment of the An electromagnetic valve 71 has a valve body 42A driven by a solenoid 72. When the solenoid 72 is energized, the valve body 42A opens a valve port 51. On the other hand, when the solenoid 72 is not energized, the valve body 42A closes the valve port 51.

The actuation of the solenoid 72 is controlled by a control device 34A. The control device 34A determines the energization of the solenoid 72 on the basis of signals from a second throttle valve opening detecting sensor 37 and in accordance with the opened position of the second throttle valve 32.

More specifically, when the second throttle valve 32 is opened to a position indicated by the arrow D, the solenoid 72 is not energized. In this case, therefore, the valve body 42A closes the valve port 51.

Conversely, when the second throttle valve 32 is closed to a position indicated by the arrow E, the solenoid 72 is energized. In this case, therefore, the valve body 42A opens the valve port 51.

The case when the second throttle valve 32 is opened to the position indicated by the arrow D is the normal operating condition where no wheel slip is taking place. In this case, since the valve body 24A closes the valve port 51, the situation is the same as when the atmospheric air introducing device 40A is not provided.

The case when the second throttle valve 32 is closed to the position indicated by the arrow E is when the traction control system is being operated. In this case, therefore, atmospheric air is introduced from an atmospheric air supply passage 61A to the second chamber 15 of the exhaust gas recirculation control valve 5 through the valve port 51. As a result, no exhaust gas recirculation is effected.

In this way, the system in accordance with the second embodiment operates in exactly the same way as the system in accordance with the first embodiment.

The other facts concerning the system shown in FIG. 2 are the same as those described in the first embodiment or correspond thereto, and a further description of these facts will be omitted as corresponding reference numbers are employed for them in FIG. 2.

We claim:

1. An exhaust gas recirculating system for an internal combustion engine having an intake passage, a main throttle valve located in the intake passage, and an exhaust passage, the engine being installed in an automotive vehicle provided with a traction control system including means for sensing slippage of a drive wheel of the vehicle during acceleration, a second throttle valve located in the intake passage upstream of the main throttle valve, and means for moving the second throttle valve toward a shut position in response to a wheel slip signal from said slippage sensing means for preventing drive wheel slip during acceleration of the vehicle, wherein the exhaust gas recirculating means comprises:

an exhaust gas recirculating passage connecting the exhaust passage with the intake passage at a location downstream from the main throttle valve;

an exhaust gas recirculation control valve positioned in the exhaust gas recirculating passage;

a pressure sensing port in the intake passage located to be upstream of the main throttle valve when said main throttle valve is shut and to be downstream of the main throttle valve when said main throttle valve is opened beyond a predetermined load position;

means connected to said pressure sensing port for actuating said exhaust gas recirculation control valve to open the exhaust gas recirculation passage in response to a negative pressure at said sensing port; and exhaust gas recirculation interrupting means which operates to make said exhaust gas recirculation control valve shut the exhaust gas recirculation passage when said second throttle is moved toward the shut position in response to a wheel slip signal from said slippage sensing means.

2. An exhaust gas recirculating system according to claim 1 wherein said exhaust gas recirculation interrupting means operates to introduce atmospheric air pressure in the connection between the means for actuating the exhaust gas recirculation control valve and the pressure sensing port.

3. An exhaust gas recirculating system according to claim 2 wherein said exhaust gas recirculation interrupting means comprises a diaphragm valve having an inlet side communicating with the atmosphere and an outlet side communicating with the connection between the means for actuating the exhaust gas recirculation control valve and the pressure sensing port.

4. An exhaust gas recirculating system according to claim 3 wherein said diaphragm valve is spring-biased toward a shut position and is opened in response to a predetermined pressure differential across said second throttle valve.

5. An exhaust gas recirculating system according to claim 2 wherein said exhaust gas recirculation interrupting means comprises an electromagnetic valve having an inlet side communicating with the atmosphere and an outlet side communicating with the connection between the means for actuating the exhaust gas recirculation control valve and the pressure sensing port.

6. An exhaust gas recirculating system according to claim 5 wherein said electromagnetic valve is actuated to open in response to a wheel slip signal from said slippage sensing means.

* * * * *